May 17, 1932. H. A. PARADIS ET AL 1,858,748
PROTECTIVE DEVICE FOR THE TERMINALS OF STORAGE BATTERIES
Filed Aug. 13, 1929
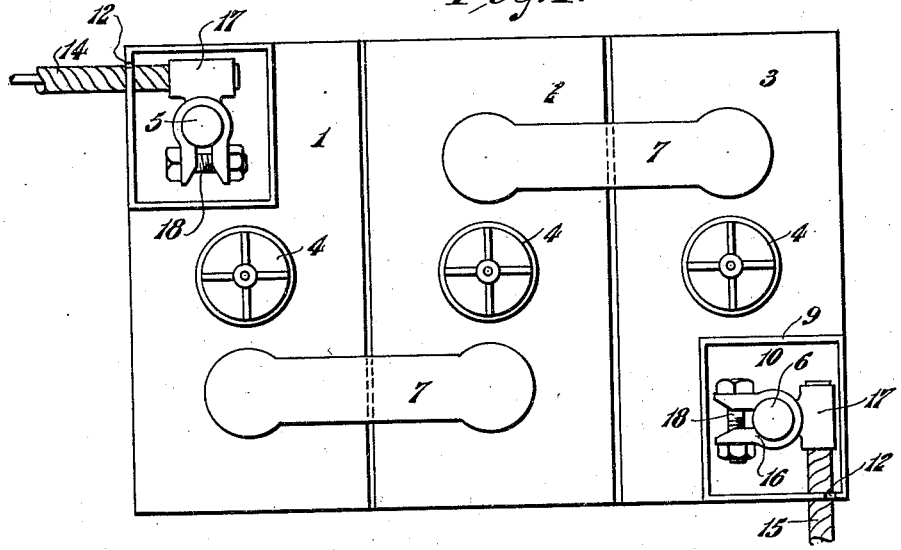
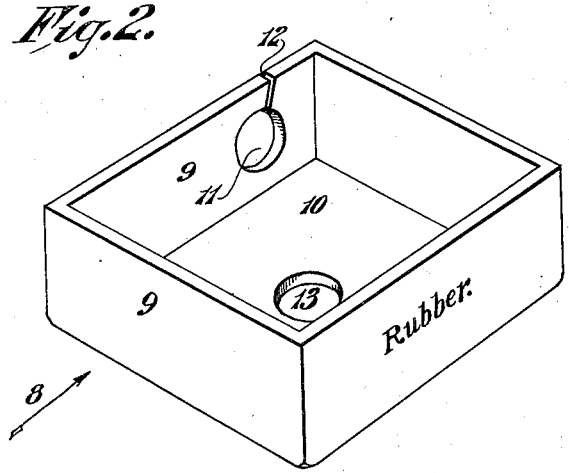
INVENTORS,
Henry A. Paradis,
Walter C. Anderson,
BY
Harry W. Bowen
ATTORNEY.

Patented May 17, 1932

1,858,748

UNITED STATES PATENT OFFICE

HENRY A. PARADIS AND WALTER C. ANDERSON, OF CHICOPEE FALLS, MASSACHUSETTS

PROTECTIVE DEVICE FOR THE TERMINALS OF STORAGE BATTERIES

Application filed August 13, 1929. Serial No. 385,653.

This invention relates to improvements in protective devices for the terminals of storage batteries.

An object of the invention is to provide means for overcoming the corroding effects of the terminals by reason of the acid vapors which settle on the upper surface of the storage battery. It is a well known fact that, when the batteries are being charged, and near the completion of the charge, the batteries emit vapors due to the bubbles rising to the surface of the plates, especially when the filling plugs are removed. These vapors settling on the terminals cause corroding.

It is also a well known fact that the positive terminal of the storage battery corrodes more freely than the negative terminal, possibly due to the charging current entering and the discharging current leaving the positive terminal resulting in the cable terminal clamps becoming firmly secured to the battery terminals.

The present invention broadly comprises a cup-shaped member formed preferably of soft rubber and having an opening in its bottom adapted to receive the terminal of the battery and a second opening in one of the sides of the member thru which the cable passes. The battery terminal clamp is located within the cup-shaped member and the recessed part of the clamp is located opposite the opening in the side of the cup.

Referring to the drawings:

Fig. 1 is a top plan view showing the upper surface of three storage batteries illustrating the filling caps, the connecting bars and the two end terminals, and Fig. 2 is a perspective view of the protective cap removed from the battery.

Referring to the drawings in detail:

1, 2 and 3 designate the three cells of the 6 volt type; 4 are the usual closure caps; 5 and 6, the terminals of the two end batteries and 7 are the usual bars for electrically connecting the batteries together in series. 8 designates, as a whole, the cup-shaped member, which is composed of flexible rubber having the side portions 9 and the bottom portion 10. One of the sides 9 is formed with an opening 11 which communicates the slit 12.

Formed in the bottom 10 is the opening 13. Each of the terminals 5 and 6 are inserted in the opening 13. The cables 14 and 15 each pass thru the opening 11, the insertion being facilitated by means of the slit 12. The battery clamp 16 is now placed on each of the terminals and the cables inserted in the part 17, the clamp being secured by pinching or soldering. The bolt 18 is now tightened to draw the clamp firmly on to the terminals. The member 8 being of rubber, it effectually prevents the creeping of any current along the surfaces of the battery to the terminals and also prevents any moisture from gaining access to the terminals, by reason of the opening 13 closely fitting the battery terminals.

For the purpose of removing the battery as a whole from the motor vehicle it is only necessary to loosen the bolts 18 and the cables may be removed from the openings 10 by reason of the flexible side walls 9 through the slits 12. It has been found from actual practice that the rubber cup-shaped members thoroughly prevent the battery terminals from corroding, due either to the combined action of the electric current and vapor, or, to the vapors alone.

What we claim is:

As an article of manufacture, a cup-shaped member formed of soft rubber having an opening in its bottom portion to permit stretching for receiving a battery terminal of a storage battery for providing a leakproof fit around the terminal and another opening in a side of the cup-shaped member for receiving a battery cable, the second opening having a slit communicating with the same and extending to the upper edge of the cup-shaped member for permitting the easy insertion and removal of the cable of the battery, whereby the said member may be readily placed on a battery terminal and removed, and whereby a battery cable may be readily placed on a terminal and removed.

HENRY A. PARADIS.
WALTER C. ANDERSON.